United States Patent
Phillips

[11] 3,807,285
[45] Apr. 30, 1974

[54] CONNECTION BETWEEN ROD AND PISTON OF FLUID POWER CYLINDER

[75] Inventor: John Frost Phillips, Stillwater, Okla.

[73] Assignee: The Cessna Aircraft Company, Wichita, Kans.

[22] Filed: Apr. 17, 1972

[21] Appl. No.: 244,692

[52] U.S. Cl. .................................. 92/255, 403/377
[51] Int. Cl. ............................................. F16j 1/12
[58] Field of Search ...................... 92/255, 257, 258; 287/DIG. 7, 20 P; 285/321; 403/377

[56] References Cited
UNITED STATES PATENTS

| 3,426,657 | 2/1969 | Bimba | 92/255 |
| 502,686 | 8/1893 | Tilton | 287/DIG. 7 |
| 2,216,577 | 10/1940 | Stillwagon | 287/20 P |
| 3,334,937 | 8/1967 | Jofeh | 285/321 X |
| 3,361,453 | 1/1968 | Brown et al. | 285/321 |
| 3,426,656 | 2/1969 | Bimba | 92/255 |
| 3,594,024 | 7/1971 | Hertell | 287/20 P |

Primary Examiner—Irwin C. Cohen
Attorney, Agent, or Firm—Edward L. Brown, Jr.

[57] ABSTRACT

A positive connection between rod and piston of a double end rod fluid power cylinder accomplished with a single v-shaped groove in the piston rod, a single snap ring and a threaded bushing. The assembly tolerates ordinary dimensional variations and eliminates play between rod and piston by forcing the snap ring into contact with both rod and piston by means of beveled surfaces in the rod groove, in the piston and on the adjustable bushing which brings these four beveled surfaces into bearing on the snap ring.

1 Claim, 5 Drawing Figures

PATENTED APR 30 1974 3,807,285

CONNECTION BETWEEN ROD AND PISTON OF FLUID POWER CYLINDER

BACKGROUND OF THE INVENTION

This invention concerns improvement in the attaching of a piston to a rod in a fluid power cylinder. Such a cylinder consists of a tubular case, a welded head, including a port at each end, and a piston attached to a rod which passes through one or both heads. Some cylinders are double acting in that fluid under pressure may be admitted to either end of the cylinder to drive the piston and its attached rod toward the other end of the cylinder. In a double end rod cylinder, the problems have been related in positively attaching the piston to the rod.

To avoid metal to metal impact and the resulting short operating life, it is necessary to fix the piston to the rod without play. There are established and satisfactory methods for doing this when the piston is on the end of the rod. However, on a double end rod, machining a shoulder in the rod for one end of the piston to bear against, and threading a portion of the reduced rod section to engage a lock nut which will bear against the other end of the piston, results in reducing the diameter of the rod, from the piston all the way to one end, by the amount used for the shoulder plus that needed for the depth of thread and clearance for the lock nut. This reduces the strength of the rod and is costly. Welding or brazing the piston to the rod, instead of the above mentioned machining, causes the assembly to warp which is not tolerable nor is straightening practicable.

In U.S. Pat. No. 3,426,657, Bimba discloses one method to make the desired connection. He mentions close tolerance machining required of a prior construction and discloses a connection using two grooves in the rod, two split rings bearing against opposing bearing surfaces in the grooves and in the piston and its adjustable bushing. This eliminates the need for close tolerance fit between a single split ring and its groove in the prior construction mentioned. The present invention accomplishes the connection with ordinary tolerances using a single groove and ring, thereby reducing the machining, the material, and the required length of the piston assembly. Also, the single v-shaped groove is not as great a stress raiser as the prior straight sided groove and therefore the fatigue strength of the rod is increased.

BRIEF SUMMARY OF THE INVENTION

The object of this invention is to attach the piston to the rod of a fluid power cylinder using simple and inexpensive methods, but avoiding one or more of the disadvantages of the prior art.

The invention is an improvement in the attaching of the piston to the rod of a double end rod, fluid power cylinder by means of a snap ring, circular in cross section, fitting into a v-shaped groove in the rod and also positioned to bear against similarly beveled surfaces within the bore of the piston, one of which beveled surfaces is part of a threaded adjustable bushing in the piston. This bushing, when tightened, brings the four beveled surfaces, the two of the v-shaped groove in the rod, one within the bore of the piston, the other on the bushing in the piston, all into bearing on the snap ring thereby removing all play from the connection.

Ordinary machining tolerances can be accommodated because the adjustable bushing can bring the beveled surfaces into bearing on the snap ring even though these beveled surfaces may be slightly oversized or undersized or vary in the bevel angle. The snap ring is formed as a part circle which snaps into place in the v-shaped groove. It may be modified by forming it into two half circles making up a split ring. Another modified form of the invention is a ring hexagonal in cross section instead of circular. The hexagonal shape would permit decreasing the depth of the v-shaped groove which would increase the effective diameter of the rod.

While particularly useful in double end rod fluid power cylinders, this invention may also be used to advantage on single end rod cylinders, for example, to use the identical piston in the two different types of cylinders.

DETAILED DESCRIPTION OF THE INVENTION

Figure 1:
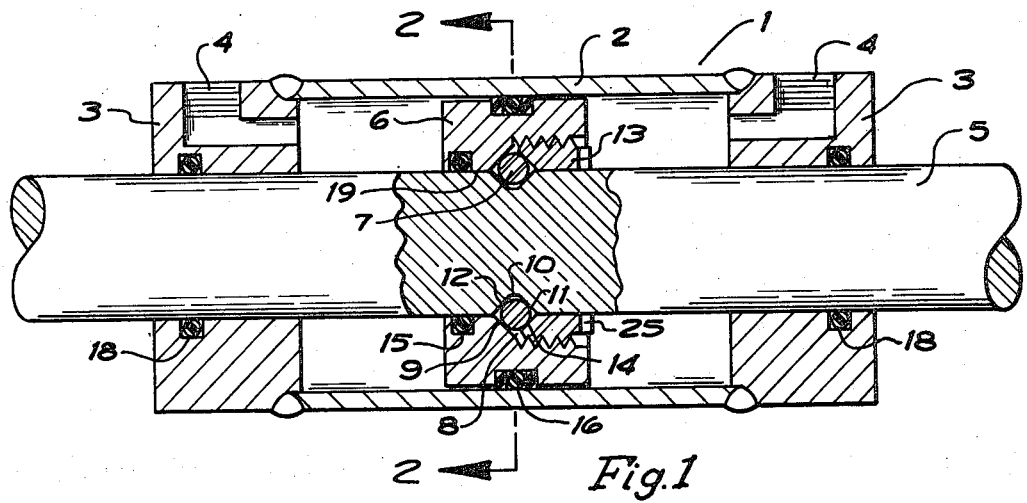
FIG. 1 shows a longitudinal section through a double end rod, cylinder and the attachment of the piston to the rod.

Referring to FIG. 1, there is shown a double end rod, fluid power cylinder 1 consisting of a tubular case 2 closed at each end with heads 3. Ports 4 permit entry and exit of pressurized fluid. Rod 5 extends axially through tubular case 2, piston 6, snap ring 7, bushing 13, and through and beyond both heads 3. The conventional seal and packing ring 16 prevents leakage between the piston and cylinder wall, while seal 15 prevents leakage between the piston and rod. The seals 18 prevent any leakage around the rods 5. The foregoing describes a conventional dobule end rod fluid power cylinder.

Figure 2:
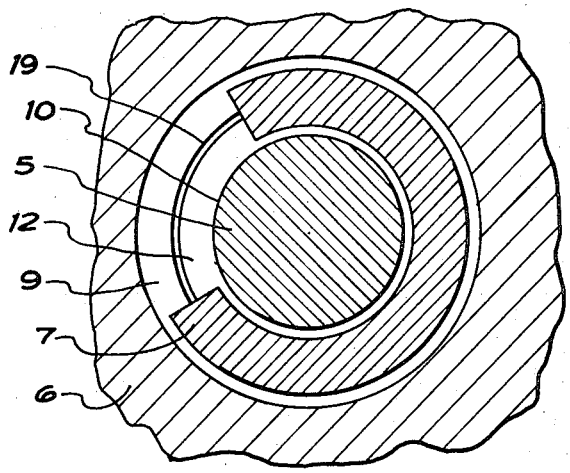
FIG. 2 shows a fragmentary section taken along lines 2 — 2 of FIG. 1.
Figure 3:
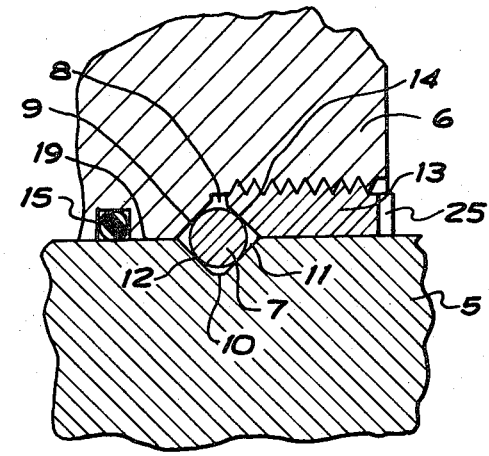
FIG. 3 is an enlarged view of a portion of FIG. 1 showing the detail of the piston to rod connection.

This invention, referring to FIGS. 1, 2 and 3, includes the rod 5 having a v-shaped circumferential groove 10 with its beveled sides 11 and 12. The snap ring 7 has a somewhat greater than a half circle in circumference with a circular cross section which extends outside and inside of the circumference of rod 5 an approximately equal distance. The axial bore 19 of piston 6 is enlarged at one end to form an internally threaded recess 8 with the beveled seat 9 at its inner end. An externally threaded bushing 13 has a companion beveled seat 14 at its inner end. The bore of bushing 13 and the bore 19 of piston 6 are of a size to form a sliding fit on rod 5. Bushing 13 is provided with slots 25 to provide purchase for a spanner wrench.

Figure 4:
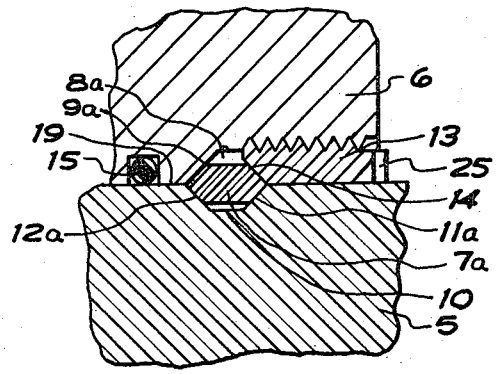
FIG. 4 is a view similar to FIG. 3 but showing a modified form of the invention.

Referring to FIG. 4, there is shown a modified form of the groove and ring consisting of the rod 5 having the truncated v-shaped circumferential groove 10 with its beveled sides 11a and 12a, and the snap ring 7a of hexagonal cross section.

Figure 5:
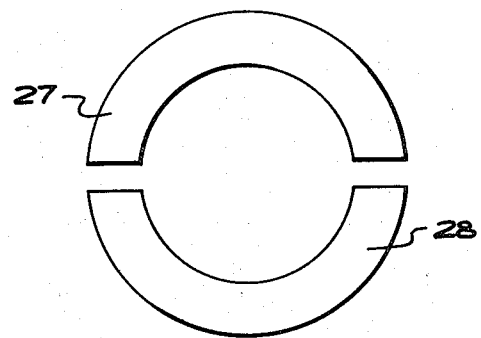
FIG. 5 is a further modified form of the invention.

Referring to FIG. 5, a further embodiment is shown with a split type ring comprising two similar half sections 27 and 28 in place of the snap ring 7.

METHOD OF ASSEMBLY

The snap ring 7 is engaged in groove 10 before the piston 6 is slid onto the rod 5 to position where beveled surface 9 of the piston comes in contact with ring 7. As the threaded bushing 13 is threaded into the piston, the beveled surfaces 9 and 14 come together forcing the ring 7 from its outer circumference radially inward into groove 10 on the rod. This creates a substantially rigid connection between the piston 6 and rod 5 with a substantial bearing contact created between the respective beveled surfaces and the ring 7. The tightening of bushing 13 is effected through the use of a spanner wrench in slots 25. The bushing 13 can be locked in place by deforming the exposed portion of the outer thread in the piston bore.

Having described the invention with sufficient clarity to enable those familar with the art to construct and use it, I claim:

1. A piston rod connection in a double ended rod fluid power cylinder wherein the improvement comprises:

a single circumferential groove in the piston rod having a truncated v-shaped cross section;

ring means partially receivable in the groove, said ring means being hexagonal in cross section with its longitudinal dimension in cross section being greater than its radial dimension in cross section;

a piston;

a concentric opening through the piston for receipt of the piston rod having an enlarged portion therein, a first beveled surface in the enlarged portion of the opening positioned to contact a portion of the ring means;

a bushing member axially receivable in the opening having a second companion beveled surface oppositely positioned with respect to said first surface; and means for urging the bushing into the opening whereby the two beveled surfaces are brought together forcing the ring means into the circumferential groove effecting a rigid connection.

* * * * *